United States Patent [19]

Rickel et al.

[11] 4,163,457
[45] Aug. 7, 1979

[54] TERMINATION FIXTURE FOR A CORRUGATED DRAIN HOSE

[75] Inventors: William Rickel; Dennis W. Hauch, both of St. Joseph, Mich.

[73] Assignee: Whirlpool Corporation, Benton Harbor, Mich.

[21] Appl. No.: 793,137

[22] Filed: May 2, 1977

[51] Int. Cl.² ............................................. F03C 1/12
[52] U.S. Cl. .................................. 137/216; 137/797; 248/75
[58] Field of Search ..................... 137/216, 360, 797; 248/75; 285/4

[56] References Cited

U.S. PATENT DOCUMENTS

| | | | |
|---|---|---|---|
| 2,671,626 | 3/1954 | Schmadeke | 248/75 |
| 2,756,076 | 7/1956 | Rodriguez | 285/4 |
| 3,897,923 | 8/1975 | Paepke et al. | 248/75 |
| 4,069,837 | 1/1978 | Jirasek | 137/360 |

*Primary Examiner*—Gerald A. Michalsky
*Attorney, Agent, or Firm*—Hill, Van Santen, Steadman, Chiara & Simpson

[57] ABSTRACT

A hose receiving member constructed as a unitary plastic article is specifically adapted to connect an anti-kink corrugated plastic hose to an appliance such as an automatic washer in either a standpipe installation or a laundry tub installation when used with a metal or plastic hose guide member. The plastic hose guide member connects to an outlet pipe of the member near an upper end thereof adjacent an end of the corrugated hose. This guide member has a curvilinear upper surface which curves from a vertical orientation adjacent the end of the hose connection fitting through an arc of at least 180° in a plane including an axis of the outlet pipe. A planar rib maintains the surface in its desired shape. Two retaining ties on the guide member grasp the hose, clamping it to the curvilinear surface, one tie being used to bend the hose approximately 90° and both used for a bend of approximately 180°. The metal hose guide member comprises an "S"-shaped member with a raised center portion between co-planar ends which are hooked to capture spaced-apart portions of the corrugated hose.

3 Claims, 10 Drawing Figures

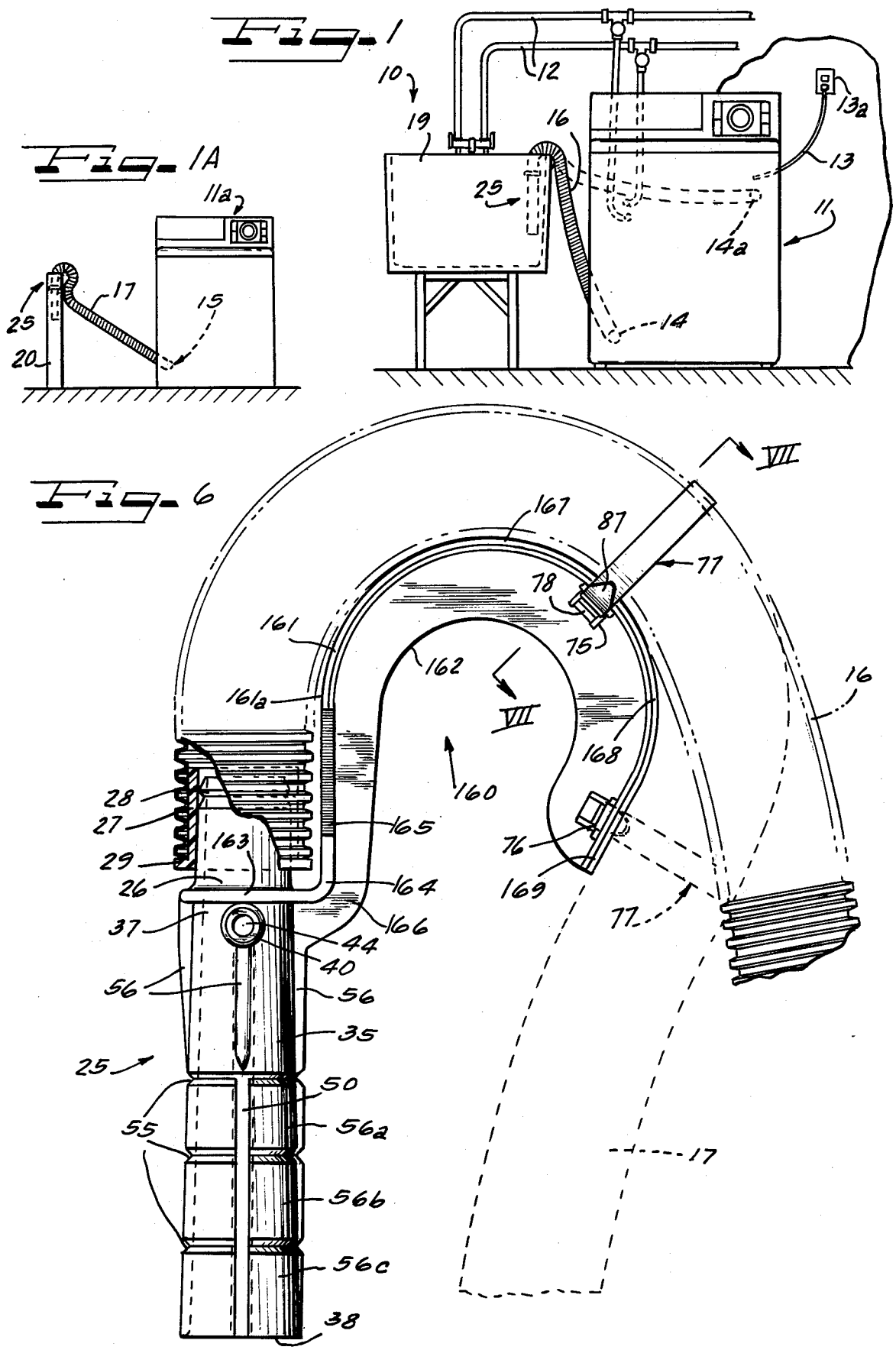

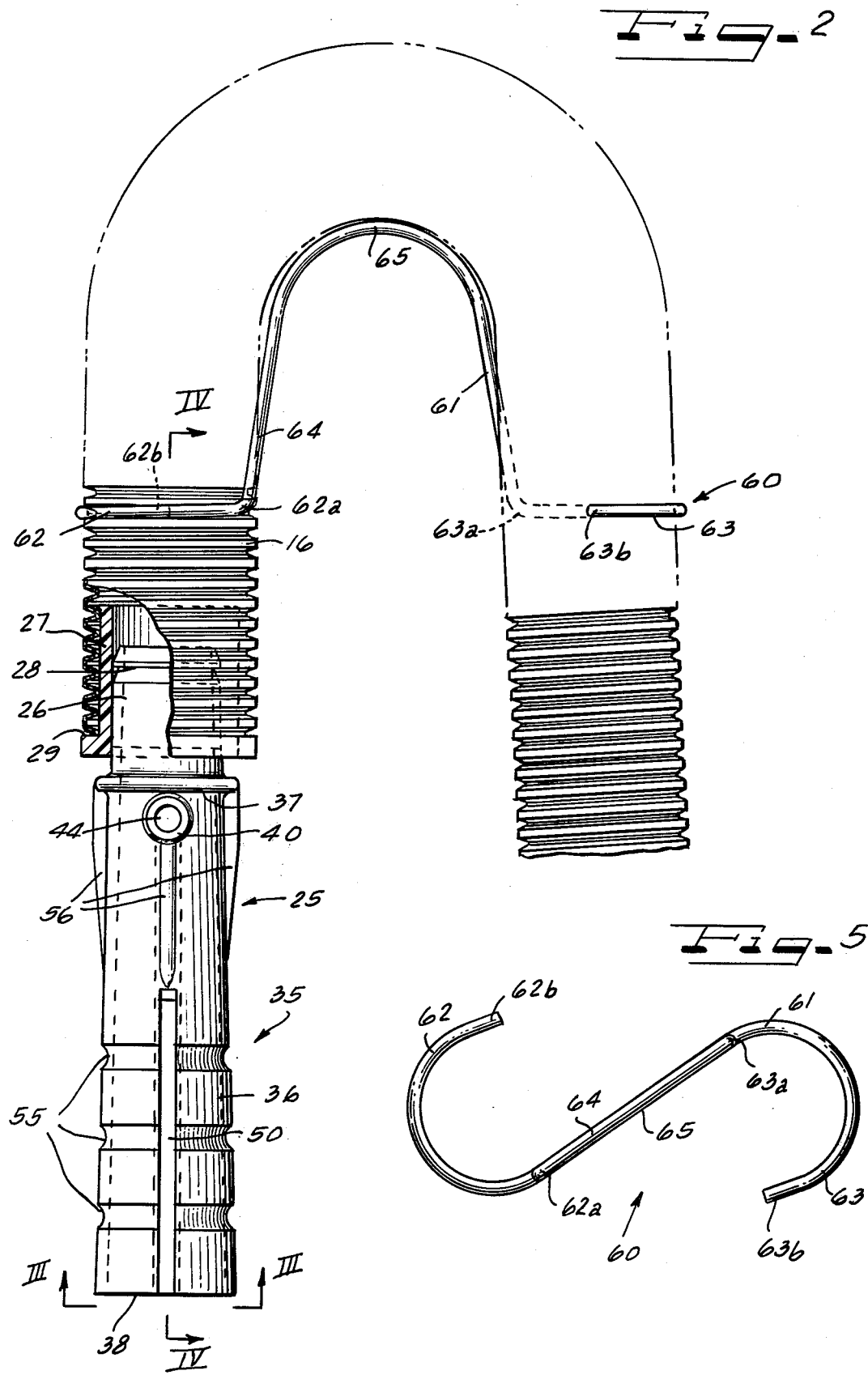

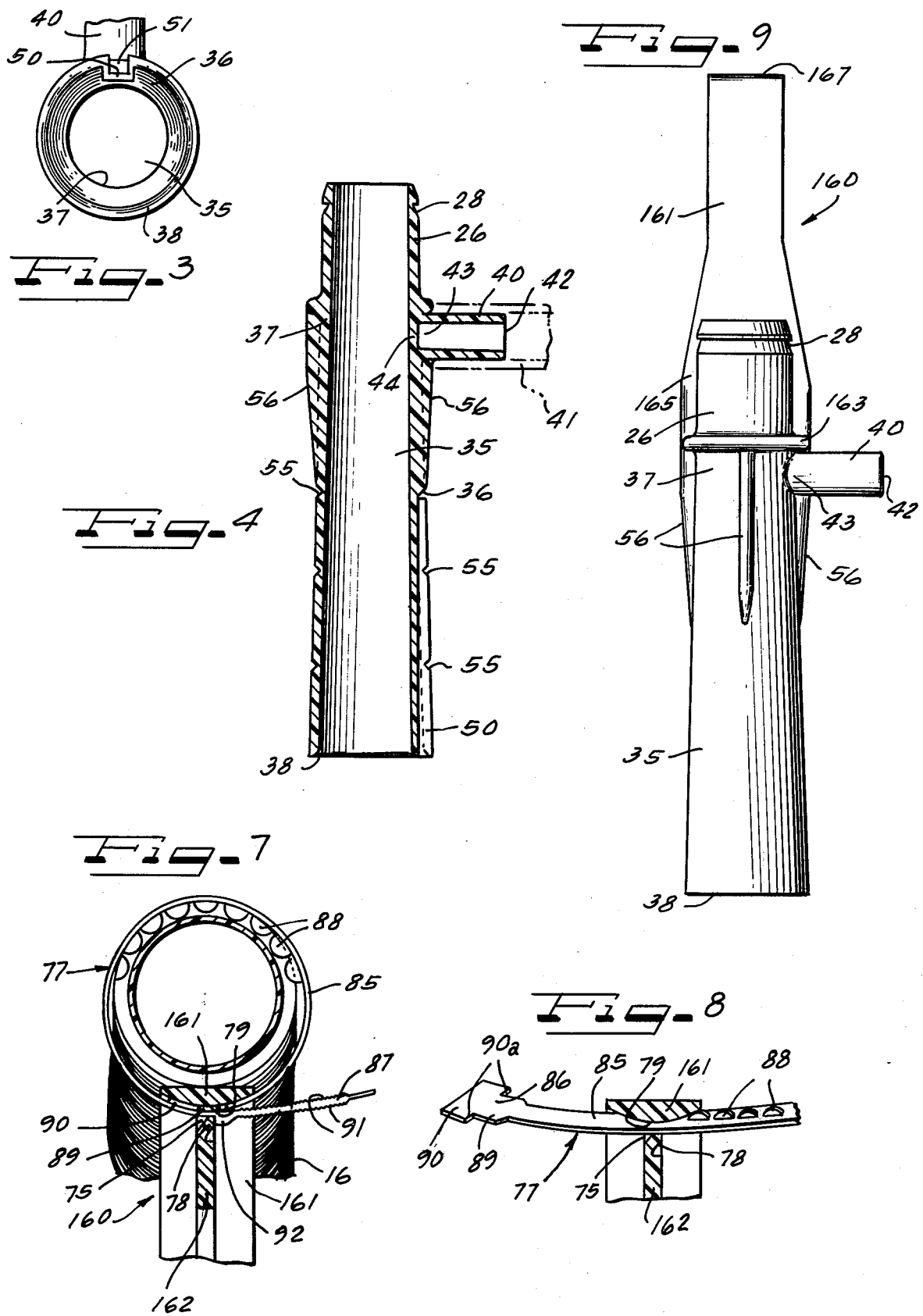

4,163,457

TERMINATION FIXTURE FOR A CORRUGATED DRAIN HOSE

BACKGROUND OF THE INVENTION

1. Field of the Invention

The present invention relates to devices for retaining ends of hoses and the like in desired relation to a waste water receptacle.

2. The Prior Art

Heretofore, tubing or hosing used for passing spent laundry liquid to a laundry tub, a standpipe, or a drain has usually been made of rubber or rubber-like synthetics which can be permanently bent into desired configurations. Such hosing has been susceptible to kinking, particularly if used with a moveable appliance.

Flexible, corrugated plastic tubing has recently been made available which is suitable for carrying waste water. Such hose, although bendable, usually returns to an elongate configuration and has favorable anti-kink characteristics. It may be relatively stiff and is likely to fracture if unduly bent or if chafed.

Hoses for domestic appliances carry a large flow of water at relatively high pressure, thereby tending to cause any bend therein to straighten out. Thus, arranging the end of a corrugated plastic hose to fit into a standpipe or a wash tub is difficult without special fittings therefor. Special fittings have been developed, such as the curvature device of U.S. Pat. No. 3,897,923, formed as a segment of a toroid through which an end of a flexible hose is passed. Early devices for either shaping or reinforcing hose devices are shown in U.S. Pat. Nos. 2,189,364 and 2,671,626, both employing wires to hold a hose end in a desired curve. U.S. Pat. No. 2,853,262 provides a support for a hose extended from a water spigot and includes a spring mounted to position a hose segment pivotably about a water inlet, the hose being bent in an inverted "U" and carrying a spray and water valve assembly on a free end thereof.

SUMMARY OF THE INVENTION

A termination fixture which may advantageously be used with a corrugated, plastic hose for an appliance such as an automatic washer comprises an outlet pipe having a side wall forming an internal flow passage and having opposite upper and lower ends. A hose connector nipple on the upper end of the outlet pipe receives the corrugated hose in fluid-tight relation for communication of water from the hose through the connector and into and through the outlet pipe flow passage. A hose guide member in a first embodiment comprises a stiff wire formed in an "S"-shape with co-planar ends and a raised center portion having the radius of a desired inside bend in the hose. The hooked ends grasp the hose at two spaced points and the center forms a hook to protect the hose from the edges of a wash tub over which the center is placed.

In a second embodiment the hose guide member comprises a plastic curvilinear surface extending through an arc of at least 90° form an axis of the outlet pipe. A planar rib arranged transversely to the curvilinear surface is connected to the outlet pipe adjacent the hose connection nipple and braces the curvilinear surface in a plane including an axis of the outlet pipe. At least one retaining tie is affixed to the plastic guide member for clamping the hose to the curvilinear surface to impart at least a 90° bend thereto. If it is desired to extend the bend along the curvilinear surface through at least 180° from the outlet pipe axis, a second retaining tie is employed. The retaining ties are formed separately and are mounted through apertures in the planar rib. Projections on the ends of the ties lock them into place in the guide member.

A portion of a wall of the outlet pipe is depressed inwardly to form a siphon break vent; a molded port is fitted to a wall of the pipe for attachment of a secondary drain line as from a furnace humidifier or water softener; and grooves are formed about the circumference of the pipe to guide cutting of the pipe to reduce its length.

THE DRAWINGS

FIG. 1 is a general front elevational view of a laundry tub installation embodying a washer utilizing the principles of the present invention;

FIG. 1A is a general elevational view similar to FIG. 1 but of a stand pipe installation;

FIG. 2 is a side elevational view, partially cut away, of a first metal hose guide member embodiment of the device of the invention, with a corrugated drain hose;

FIG. 3 is a plan view of a lower, outlet end of the outlet pipe, line III—III of FIG. 2;

FIG. 4 is a sectional view through the outlet pipe, port, and air vent, on line IV—IV of FIG. 2;

FIG. 5 is a top plan view of the wire hose guide member of FIG. 2;

FIG. 6 is a side elevational view, partially cut away, of a second embodiment of the device of the invention with an integral plastic hose guide member thereon and fitted with a corrugated drain hose;

FIG. 7 is a sectional view through the corrugated hose and hose guide member, on line VII—VII of FIG. 2, showing a hose retainer tie in side elevation.

FIG. 8 is a perspective view, partly in section, of a retaining tie in the hose guide member in accordance with the invention.

FIG. 9 is a front elevational view of the termination fixture of the second embodiment.

THE PREFERRED EMBODIMENTS

While the present invention has applicability wherever a corrugated plastic hose may be used in connection with an appliance such as a washing machine or a dishwasher, exemplary disclosure is made herein as applied to an automatic washer. Typical automatic washing machine installations are shown in FIGS. 1 and 1A, namely, a laundry tub installation in FIG. 1 and a standpipe installation in FIG. 1A.

In FIG. 1, a machine 11 is supplied by hot and cold water pipes 12. An electric cord 13 is connected to the usual electric outlet 13a. Laundry liquid from the washing and rinsing operations of the machine 11 is pumped under pressure through an outlet 14 in the back of the machine and through an anti-kink corrguated plastic hose 16 into a laundry tub 19. The tub 19 may function temporarily to store laundry liquid as with machines of the type utilizing a recycling action for laundry liquid and also functions as a drain for spent laundry liquid.

In FIG. 1A the machine 11a has an outlet 15 connected via an anti-kink corrugated plastic hose 17 to a standpipe 20 forming a drain for the appliance.

In each instance it is contemplated by the present invention that there will be employed a conduit or hose 16 or 17 which may be of the anti-kinking type, and made of a plastic material which is essentially a flexible cylindrical type having axially spaced corrugations disposed uniformly along the length of the tubing.

In accordance with the principles of the invention, a termination fixture 25 is selectively adaptable for use on the side of a laundry tub or wash basin 19 or with a standpipe 20, and serves to discharge liquid received through a hose either from the outlet 14 disposed at the bottom of the machine or from an upper outlet 14a. The structure of the termination fixture 25 is shown in detail in FIGS. 2 and 6, together with the hose 16 in solid lines and the alternate position of the hose 17 in broken lines.

As shown in FIG. 2, in accordance with the principles of the invention, the termination fixture 25 is joined to the corrugated hose 16 by a nipple fitting 26 over which the end of the hose 16 is received. A deformable sleeve 27 mates between the relatively hard plastic of the nipple 26 and the corrugated interior of the hose 16 to assure a fluid-tight but simple press fit. The deformable sleeve 27 is fitted inside the end of hose 16 prior to slipping the end over the nipple 26, where the sleeve is tightly engaged by an annular groove 28 formed near the end of the nipple. An annular abutment surface 29 about a lower end of the sleeve 27 further improves the seal between the hose 16, the sleeve 27, and the connection nipple 26.

Formed integrally with the connection nipple 26 and in axial alignment therewith is an outlet pipe 35 having a wall 36 arranged as a slightly tapered cylinder or a cone, broadening from an upper end 37 thereof adjacent the nipple 26 to a lower end 38. The slight tapering of the wall 36 is also shown in FIG. 3. In accordance with the invention, the outside diameter of all or part of the outlet pipe 35 may be less than the outside diameter of the corrugated hose 16, and the termination fixture 25 may readily be employed in standpipes 20 having, for instance, a 1½ inch inside diameter.

At the upper end 37 of the outlet pipe 35 there is provided an integral, molded boss and nipple or port 40 which is normally closed and sealed, comprising an annular wall formed integrally with the wall 36 of the pipe 35. The port 40 is adapted to receive, for instance, a one-half inch inside diameter hose 41 in a snug-fitting relationship thereover, as in FIG. 4. An outer end 42 of the port or nipple 40 is open, but an inner end 43 is closed by an end member 44 which is continuous on the inside of pipe 35 with the wall 36 thereof. The end member 44 is preferably of a reduced thickness in comparison to the wall 36 to facilitate removal of the end member 44, as by drilling or punching, to form a passage from the auxiliary hose 41 through the port 40 and into the outlet pipe 35. The port 40 is especially useful where a narrow standpipe 20 is employed for the washer outlet hose 17 and discharge of the hose 41 from some other household or domestic appliance such as a water softener backwash or humidifier drain into the standpipe 20 would otherwise be precluded.

Also in accordance with the invention, and useful with a snug-fitting standpipe 20, a longitudinal depression 50 formed in the wall 36 may be provided to form an air passage or vent from the lower end 38 of the outlet pipe 35 to a point above the top of a narrow standpipe 20. A vent 51 formed by the depression 40 acts as a siphon break as required by many plumbing codes, to prevent siphoning of water from a blocked standpipe 20 back into the machine 11 through the hose 17.

Also in accordance with the invention, and increasing the utility of the downwardly outward taper in the wall 36, a plurality of circumferential grooves 55 may be provided in the wall 36 upwardly of the lower end 38 thereof. Each groove 55 locally reduces the thickness of the wall 36 to facilitate severing of the outlet pipe 35 at the groove to shorten the pipe and to provide a reduced outside diameter on a new lower end thereof for use with even smaller standpipes 20. Further any selected length can be utilized.

Upwardly of the topmost one of the grooves 55 are a plurality of reinforcing or stiffening ribs 56 extending outwardly from the wall 36.

Further in accordance with the principles of the invention, a first embodiment of a hose guide member 60 is formed as a stiff wire member 61 having generally the shape of an "S" in plan view as shown in FIG. 5. Each of oppositely-opening hook end members 62, 63 has a radius corresponding generally to that of the outside of the corrugated drain hose 16, and each has a shank portion 62a, 63a and a free end portion 62b, 63b. A center portion 64 of the hose guide member 60 joins the shank portions 62a, 63a and extends in a plane as shown in FIG. 5 upwardly of the level of the hook ends 62, 63 as shown in FIG. 2. An apex 65 of the center portion 64 has a radius of curvature substantially equal to the desired inside radius of a desired bend in the corrugated hose 16. As indicated in the drawings, center portion 64 extends diagonally across or beneath the hose as the hose undergoes the bend shown in FIG. 2, so that the center portion 64 protects the inner portion of the hose 16 from direct, chafing contact with the edge of a standpipe 20 or a wash basin 19 when used in conjunction therewith.

The shape of the hose guide member 60 may be formed to secure the hose 16 in any desired position compatible with the liquid receiving means 19 or 20, and is both simple to apply to the hose and very effective in holding the hose in the desired position, besides being inexpensive to manufacture.

A second embodiment of the hose guide member is formed integrally with the termination fixture 25 and the outlet pipe 35 on its upper end 37 adjacent the connecting nipple 26. This hose guide member 160 comprises a curvilinear surface member 161 and a planar rib 162 arranged transversely thereto and forming a hook, as shown in FIG. 6. FIG. 9 shows that the hose guide member 160 extends in a plane including the axis of the outlet pipe 35.

The curvilinear member 161 has a band portion 163 surrounding the outlet pipe 35 at the upper end 37 thereof. The band 163 is attached to the reinforcing ribs 56 at their upper ends and extends transversely to the axis of the outlet pipe 35 and the connection nipple 26. One of the ribs 56 which is on an inside portion of the fixture 25 and transversely from the side nipple member 40 extends further down the outlet pipe 35 and parallel to the axis thereof, forming further ribs 56a, b, and c as shown in FIG. 6. The outside surface 161a of member 161 extends from the band 163, through a 90° bend portion 164, and into a vertical portion 165 spaced adjacent the connection nipple 26 and the end of the hose 16 as shown in FIG. 6. The vertical portion 165 reduces in width upwardly of the nipple 26, as shown in FIG. 9, since the loads on the guide member 160 decrease away from its connection to the pipe 35. The member 161 is further supported about the bend 164 by an enlarged upper portion 166 on the inner rib 56 which merges into the planar rib 162. Further, the vertical portion 165 is preferably of an increased thickness in comparison to upper portions of the curvilinear member 161.

Upwardly of the vertical portion 165 of the hose guide member 160, the member 161 undergoes a curve through an arc of at least 180°. An uppermost portion 167 of the member 161 is horizontal in the orientation of FIG. 6, and a further portion 168 is tangent to a vertical line parallel to the axis of the pipe 35. A terminal end 169 of the member 161 returns inwardly toward the axis of the pipe 35. The curvilinear member 161 is supported, throughout its length, from beneath the band 163 to the outer end 169 by the planar rib 162. The rib 162 also forms a hook for suspension of the fixture 25 on the side of a wash basin and protects the member 161 and the hose 16 or 17 from chafing thereon.

Fixed to the hose guide member 160 through apertures 75, 76 formed in the planar rib 162 between the horizontal, uppermost portion 167 and the termination portion 169 thereof is a pair of retaining ties 77. These ties are shown in detail in FIGS. 7 and 8. Each aperture 75, 76 in the planar rib 162 has a tooth 78 formed therein, the tooth 78 being slightly flexible in a direction transverse to the rib 162. An upper end of the tooth 78 in the orientation of FIG. 8 is spaced from a cooperating surface 79 on a lower side of the curvilinear member 161 for capturing two ends of the retaining tie 77 inserted through the aperture 75.

As shown in FIGS. 6 through 8, each tie 77 comprises a flat, elongated strap portion 85 with opposite end portions 86 and 87, with transverse ribs 88 formed along the strap portion 85 between the ends thereof. The first end 86 of the retainer tie 77 has an enlarged, T-shaped, sidewardly extending portion 89 receivable snugly within an upper part of the aperture 75. A tab portion 90 has shoulder portions 90a which form an abutment surface against the sides of the planar rib 162 adjacent the aperture 75.

The transverse ribs 88 on the strap portion 85 are conveniently formed as a series of semi-circular members as shown in FIGS. 7 and 8. The individual ribs 88 are spaced apart sufficiently so that when the strap 85 is curved to engage the outer surface of the hose 16, rib members 88 will not interfere with each other. Each rib member 88 has a depth radially of the hose 16 as seen in FIG. 7 and a width axially of the hose to fit between the circular ridges or corrugations of the hose.

Once the tie 77 has been led through the aperture 75 to abut its shoulders 90a against the planar rib 162 and the hose 16 has been properly positioned on the guide surface 161, the second end 87 of the tie or strap 77 is fed through the aperture 75 between the tooth 78 and the first end 86 of the strap 77. A series of serrations 91 are formed on the upper and lower surfaces (in the orientation of FIG. 7) of the end 87 for engaging the tooth 78 during preliminary positioning. A larger locking tab 92 projects from the lower surface of the end 87 of the retaining tie 77 to be captured on the right side of the tooth 78 in a permanent or semi-permanent relationship.

For installation and in operation, after set-up and placement of the machine 11 and selection of a waste water disposal outlet from a basin 19 or a standpipe 20, the corrugated hose is cut to proper length in conjunction with the placement of the termination fixture 25. The deformable sleeve 27 is fitted within the end of the hose 16 and the end of the sleeve 27 is pressed down as far as possible over the connection nipple 26. Then the portion of the hose 16 adjacent the fixture 25 is bent into an arc and is secured either by the "S"-shaped guide member 60 of the first embodiment or by the curvilinear member 161 of the integral hose guide member 160 of the second embodiment.

In the second embodiment, a first retaining tie 77, having previously been placed through the aperture 75 so that the first end 86 is engaged beneath the tooth 78, is wrapped about the hose 16 so that the ribs 88 are engaged between two ridges of the corrugated hose. The second end 87 of the retaining tie 77 is placed through the aperture 75 and pulled through until the locking tab 92 is engaged past the tooth 78 in the aperture 75 of the planar rib 162. The hose 16 is then held in position in the termination fixture 25 and will conveniently extend from the upper outlet 14a on the machine 11. Where a lower outlet 14 or 15 is provided on the washing machine 11 or 11a, and/or where the water is to feed into a standpipe 20, the hose 17, shown in phantom lines in FIG. 2, is bent through a 180° angle about the curvilinear member 161 of the hose guide member 160. The second retainer tie 77 is fitted into the second aperture 76 through the planar rib 162 in the same manner as the tie through the aperture 75. Where both retaining ties are used, the hose itself stabilizes the termination fixture 25 with respect to the forces imposed thereon during flow of water therethrough.

Of course the invention as disclosed in the second embodiment is not limited to one or two straps 77 located as shown in FIG. 6. Any desired number and placement of straps 77 may be employed which retain the base in an orientation compatible with the arrangement of the appliance and the liquid receiving means in any given situation.

Where the termination fixture 25 is used in a thin standpipe 20, the outlet pipe 35 may be shortened and thereby reduced in diameter by severing same upon either of the lower two circumferential grooves 55. The outlet pipe 35 may conveniently be severed at the uppermost of the grooves 55 where the outlet pipe 35 is used for discharging to a laundry tub or wash basin 19 or where a standpipe 20 has a large diameter but takes an immediate bend.

Finally, where the molded port 40 is to be used for an auxiliary drain line, as from a water softener backwash or a furnace humidifier, the end member 44 of the molded port 40 is drilled or punched out. Then the hose 41 is slipped over the port 40.

In use, laundry liquid passing through the corrugated hose 16 or 17 from the machine 11 or 11a passes through the flow passage within the connection nipple 26 and the outlet pipe 35, as depicted in cross-section in FIG. 4. The downwardly increasing taper of the wall 36 insures that water from the appliance 11 does not pass into the molded port 40 and through the hose 41 to the second appliance. The siphon break vent 51 insures that where a narrow standpipe 20 is employed, no column of water remains after discharge of the machine 11 for possibly siphoning water back into the machine.

Although various minor modifications may be suggested by those versed in the art, it should be understood that we wish to embody within the scope of the patent warranted hereon all such modifications as reasonably and properly come within the scope of our contribution to the art.

The embodiments of the invention in which an exclusive property or privilege is claimed are defined as follows:

1. For use with appliances in positioning a hose relative to different liquid receiving means and for receiving and discharging pressurized liquid from the hose into the receiving means, an elongated corrugated plastic tubular hose having favorable anti-kink characteristics and being selectively bendable but returning to elongate configuration when unstressed;

an outlet pipe having an axis and a side wall forming an internal flow passage and opposite upper and lower ends, said side wall having a conical taper with a larger inside diameter at the lower outlet end than at the upper end of said pipe, said outlet pipe further having at least one annular groove means formed therein near said lower end to reduce locally a radial thickness of said side wall, thereby to facilitate severing said pipe to shorten its length, and an air vent formed by a radially inwardly extending depression formed on an outer surface of said side wall, said depression extending substantially longitudinally along said outer surface from said lower end of said outlet pipe, a plurality of planar ribs extending radially outwardly from said outer surface of said side wall, said ribs extending longitudinally along a portion of said outlet pipe;

a hose connecting means on the upper end of said outlet pipe for receiving the corrugated hose in fluid-tight relation thereto and for communicating an interior of the hose to said internal flow passage, said hose connecting means comprising a nipple formed integrally with said upper end of said outlet pipe, said nipple having an annular groove formed near an end thereof, and a deformable cylindrical sleeve, said sleeve having a diameter intermediate between an inside diameter of said hose, and an outside diameter of said nipple, said sleeve being fitted inside said hose prior to engagement with said nipple;

a hose guide means operatively associated with said outlet pipe for securing said hose into a bent shape extending through an arc of at least 90° relative to said axis of said outlet pipe;

a molded port integral with said outlet pipe located on a side wall thereof below said hose connecting means, said molded port having an annular wall and a removable end member, said end member being co-circumferential with said side wall of said outlet pipe but having a thickness substantially less than that of said side wall, such that upon perforation of said end member a coupling of a second hose for flow into said outlet pipe is facilitated.

2. The combination of claim 1 wherein said hose guide means is comprised to a stiff wire element having an S-shape with oppositely disposed and oppositely opening hook ends co-planar with one another, said hose guide means further defined by:

said open hook ends each having an end portion and a shank portion;

a center portion extending between the shank portions of the hook ends, said center portion being raised upwardly to form a 180° curvilinear surface of a radius of curvature less than the stress limits of the corrugated hose and forming buffer means extending beneath the hose as the hose is bent into curved configuration for protecting an adjacent inside portion of the corrugated hose against chafe against an adjoining support surface;

said open hook ends sized to be received in one of the corrugations of said corrugated hose, to cooperate therewith to receive and retain said corrugated hose in a bent-over shape.

3. The combination of claim 1 wherein said hose guide means comprises a member formed integrally with said outlet pipe, said hose guide means having:

a curvilinear member extending through a 90° arc and having inside and outside surfaces;

a planar rib extending transversely to said curvilinear member on said inside surface thereof; and at least one retainer means received in said guide member means for clamping said hose to the outside surface of the curvilinear member to impart at least a 90° bend to said hose.

* * * * *